United States Patent [19]
Mathews

[11] 3,734,103
[45] May 22, 1973

[54] CONCAVE FOR COMBINES

[76] Inventor: Bernard C. Mathews, P.O. Box 70, Crystal Lake, Ill. 60014

[22] Filed: Dec. 13, 1971

[21] Appl. No.: 207,444

[52] U.S. Cl. ................................................130/27 L
[51] Int. Cl. ................................................A01f 12/28
[58] Field of Search ..........................130/27 J, 27 JT, 130/27 K, 27 L, 27 H, 27 HA

[56] References Cited

UNITED STATES PATENTS

| | | | |
|---|---|---|---|
| 2,159,664 | 5/1939 | Lindgren | 130/27 J |
| 2,686,523 | 8/1954 | Young | 130/27 J |
| 3,191,607 | 6/1965 | Baumeister et al. | 130/27 K |
| 2,833,288 | 5/1958 | Scranton | 130/27 J |
| 3,124,138 | 3/1964 | Claas | 130/27 JT |

*Primary Examiner*—Antonio F. Guida
*Attorney*—Zabel Baker York and Jones

[57] ABSTRACT

The concave has a removable blanking plate located beneath the concave bars. A transverse angle extending from one side plate to the other has horizontally and forwardly extending fingers which support the blanking plate so it can be removed in the forward direction. The front concave bar extends downwardly to block removal in the forward direction. The front concave bar is removably screwed to a cross plate to permit removal of the blanking plate. Access is provided by a door in the casing walls. A flange on the blanking plate engages the front ends of the fingers to prevent rearward movement of the blanking plate.

6 Claims, 7 Drawing Figures

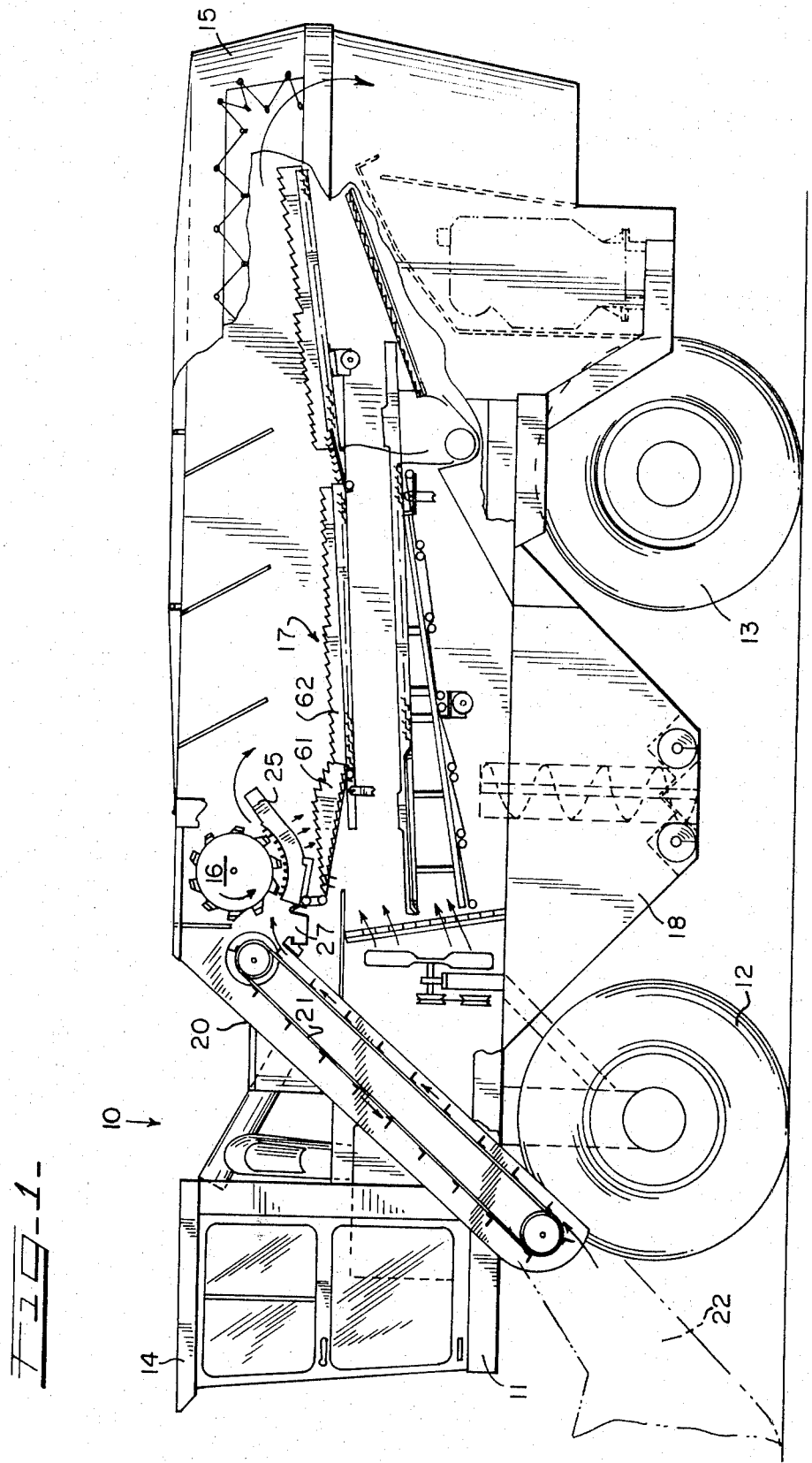

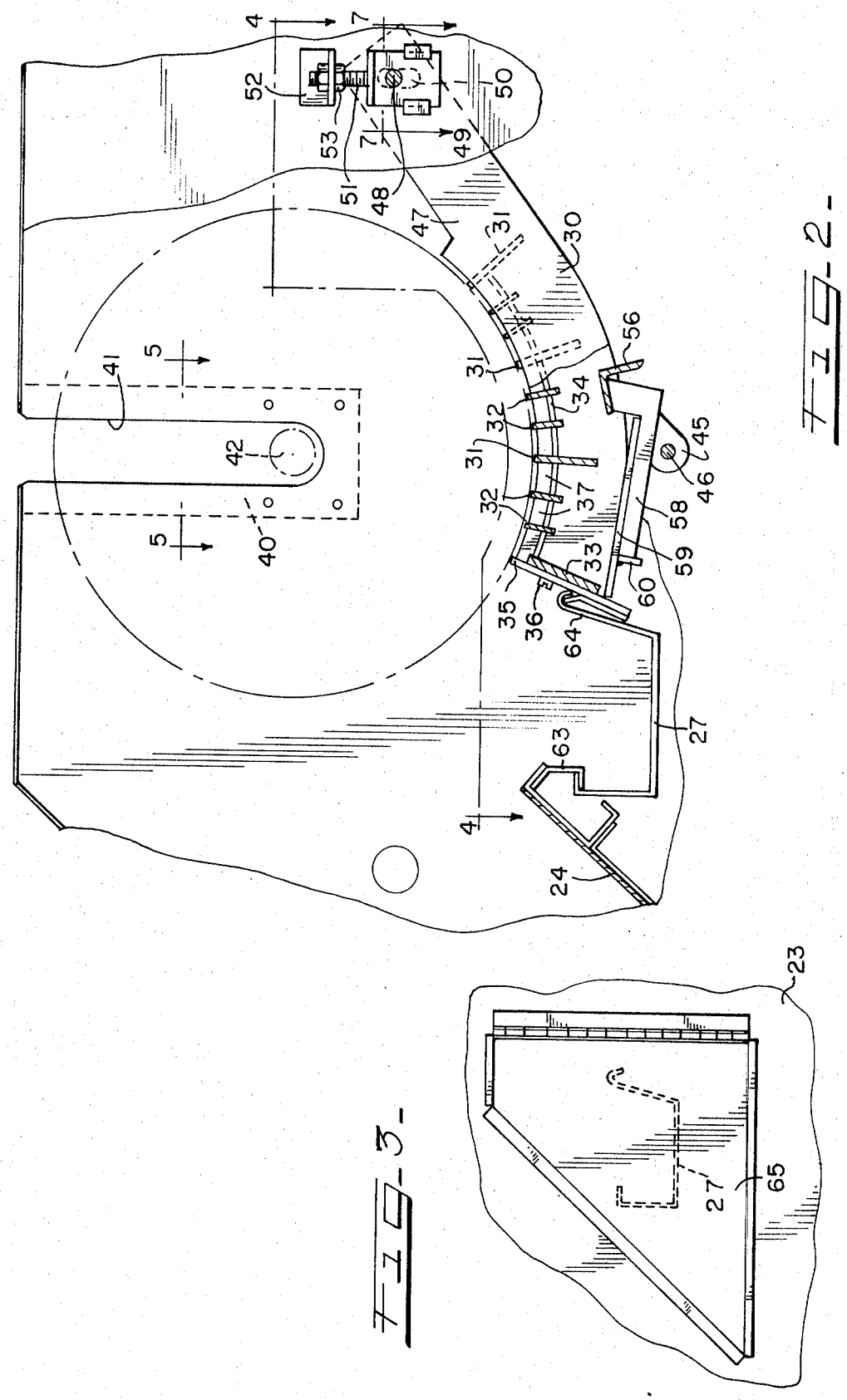

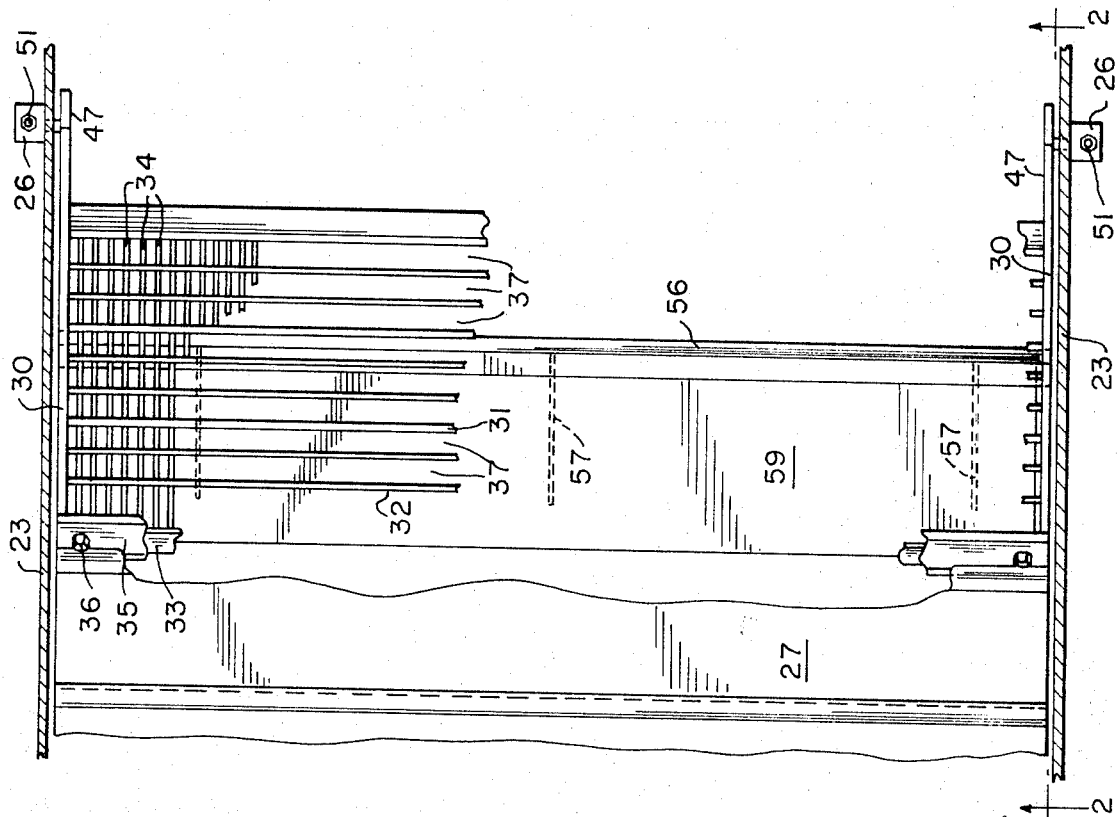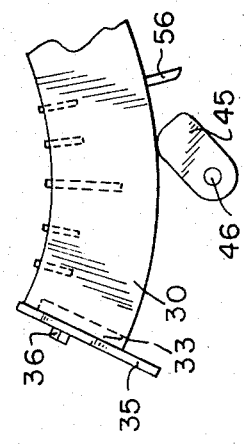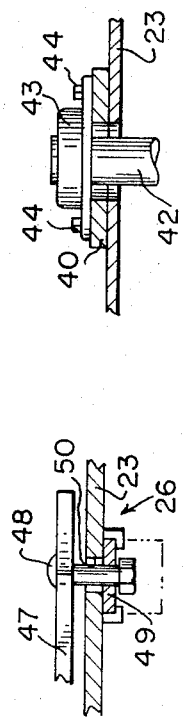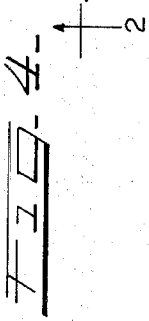

3,734,103

CONCAVE FOR COMBINES

This invention relates to an improved concave for combines, and in particular, a concave having improved blanking means.

BACKGROUND OF INVENTION

One type of concave is known as the wire grate concave. This has a plurality of spaced transverse "concave" bars which cooperate with the rasp bars of the cylinder. The spaces between the concave bars provide discharge spaces to accommodate the downward movement of the threshed crop material to the region below the concave. Longitudinally extending wires or rods pass through the bars and discharge spaces and form a grate. The mesh of the grate is adjusted by inserting or removing wires through the concave bars, in regular pattern.

Close wire spacing produces a fine grate which bars the passage of large particles through the discharge spaces and impedes the passage of threshed material through the concave so that, on the average, material is threshed over more bars before passing through the concave, and in the case of small grain, less unthreshed grain finds its way through the concave. Wide wire spacing facilitates the passage of threshed grain through the concave and avoids grain crackage from over-threshing the grain heads across too many bars.

Also, in those instances where a greater degree of threshing is desired than can be achieved by narrowing the concave wire spacing, it is customary to blank off the upper ends of the discharge spaces between the first few concave bars by inserting transversely extending metal strips between the concave bars and above the wires, and securing them in place by clipping or otherwise securing them to the wires. Either the insertion of wires, or of the blanking strips is a time consuming operation because some machine disassembly is generally required to obtain access to the concave for blanking, and because the blanking strips must be securely fastened to avoid any chance of their working loose and jamming between the concave and cylinder.

SUMMARY OF INVENTION

According to my invention, I provide a blanking plate in the form of a bottom shelf which is located beneath the front part of the concave. Threshed or partially threshed crop material builds up on the bottom shelf and blocks downward movement of subsequently threshed crop material through the first one or more discharge spaces of the concave, and additionally offers some impediment to material passage downwardly through the next few discharge spaces due to the fact that the threshed material has to work its way rearwardly off of the rear edge of the bottom shelf.

The degree of blanking is regulated by the distance the shelf extends to the rear under the concave. In practice I have found that a long, an intermediate, and a short shelf generally provide all the necessary range of adjustment of concave blanking. To recapitulate, with the blanking shelf in place, crop material which is fed into the space between the cylinder rasp bars and the concave front bars does not thresh out, down through the first few discharge spaces, but is subjected to additional passes of the rasp bars as it works its way rearwardly to a point at which it can drop down between the concave bars.

The advantage of bottom blanking is that it is much easier to insert or remove the bottom blanking shelf than to insert wires into the concave or to mount blanking strips on the concave surface between the bars. In most combines access to the concave is gained by removing the crop gathering and elevating mechanism from the combine to expose the cylinder and concave.

Also the stress of threshing heavy green stover, corn and sometimes rocks tends to deform concave wires and blanking strips and makes their insertion or removal more difficult. The bottom blanking shelf, in its position below the concave cannot be damaged by threshing stress, and neither can it be forced into a jamming position between the concave and cylinder by failure of an insecure fastening, which sometimes happens with conventional concave means.

Other objects, features and advantages will become apparent as the description proceeds.

BRIEF DESCRIPTION OF DRAWINGS

FIG. 1 is a side elevation of a combine embodying my invention, a portion of the side wall being removed and some of the elements being shown diagrammatically;

FIG. 2 is an enlarged elevation of a concave embodying my invention taken along line 2—2 of FIG. 4, a portion of an end plate being broken away, and the cylinder removed;

FIG. 3 is a fragmentary elevation of the side wall of the combine casing;

FIG. 4 is a plan view of the concave taken substantially along line 4—4 of FIG. 2;

FIG. 5 is a plan section taken along line 5-5 of FIG. 2 showing the mounting means for the threshing cylinder;

FIG. 6 is a fragmentary vertical section similar to FIG. 2, but showing the end plate and the adjusting cam for the front of the concave; and FIG. 7 is a plan view taken along line 7—7 of FIG. 2 showing the adjustment for the rear end of the concave.

DESCRIPTION OF THE PREFERRED EMBODIMENT

FIG. 1 shows a combine 10 which includes a horizontal frame 11, two front wheels 12, and a rear wheel 13. An operator's cab 14 is mounted at the front end of the frame 11, and a casing 15 is mounted on the frame rearwardly of the cab, the threshing cylinder 16 and grain separating mechanism 17 being contained within the casing 15. A grain bin 18 extends downwardly from the frame 11 between the front and rear wheels 12 and 13, as shown in FIG. 1.

Extending diagonally upward and rearward from beneath the cab 14 is a feeder conduit 20 containing a slat elevator 21 which carries threshed grain from a grain head 22 up to the threshing cylinder 16.

The casing 15 has side walls 23 which also serve as the side walls of the feeder conduit 20. The feeder conduit has a bottom wall 24, as shown in FIG. 2.

Located beneath the cylinder 16 is a concave 25. This is supported at its front end by a pair of adjustable support cams 45, and at its rear end by a pair of adjustable support brackets 26. Suitable means are provided for bridging the gap between the bottom wall 24 and the concave 25, such means being shown as a removable tray 27 which serves as a rock trap.

The concave 25 comprises side plates 30 which support the concave bars, comprising deep bars 31 and short bars 32 extending from one side plate to the other. There may also be intermediately located longitudinal reinforcing plates, not shown, to reinforce the bars 31 and 32. A front plate 33 also connects the side plates 30. The elements 31, 32, and 33 are separated by discharge spaces 37. Longitudinal wires 34 are threaded through openings in the blades 31 and 32, providing the usual grate configuration.

The front bar 35 of the concave is a removable bar and is secured to the front plate 33 by suitable screws 36. The front bar of a concave wears more rapidly than the other bars. By making the front bar 35 replaceable it is possible to lengthen the intervals between removal and rebuilding or resharpening the concave as a whole.

FIG. 2 shows the upper portion of the casing with the cylinder removed for the purpose of clarity. As shown in FIGS. 2 and 5, a ⅜-inch steel plate 40 is welded to the outer surface of the side wall 23, and a slot 41 is provided in the side wall 23 and the plate 40. A shaft 42 for the cylinder is provided with a bearing 43 which is secured to the plate 40 and side wall 23 by screws 44. Thus, by removing the screws 44, the cylinder 16 and its shaft 42, may be removed from the combine by a suitable hoist, providing access to the concave 25.

A cam 45 (FIG. 6) is provided for each side plate 30 for adjusting the gap between the concave bars 35, 31, 32 and the rasp bars on the cylinder 16. The cams 45 are mounted on a cam shaft 46 (omitted in FIG. 4) which extends through the side walls 23 and is accessible from the exterior of the casing.15.

Each side plate 30 is provided with a rearwardly extending extension 47 carrying at its outer end a pin 48 which is engaged by the adjustable bracket support 26. The latter comprises a slidable lower flanged bracket 49 mounted in suitable guides and a fixed upper bracket 52 on the external surface of each side wall 23. The pin 48 extends through a slot 50 in the side wall 23 and is received within the slidable bracket 49, as shown in FIG. 7. A stud 51 extends upwardly from the flange of the lower bracket 49 and is received within a fixed upper bracket 52. Suitable nuts 53 engage the stud 51 to draw up on the movable lower bracket 49 so as to provide an adjustment for the rear end of the concave 25.

An angle iron 56 extends the full width of the concave, being welded at either end to the side plates 30. A plurality of cantilevered brackets 57 are welded at the rear end to the angle iron 56, the side brackets 57 being spaced inwardly about 6 inches from each side plate 30, and two others being located at equally spaced intervals between the side plates. Each bracket 57 provides a forwardly extending finger 58 which terminates somewhat rearwardly of the front plate 33 of the concave 25. The upper surfaces of the fingers 58 are spaced beneath the lower edge of the deep bars 31 of the concave, providing a gap.

A blanking plate 59 is located in this gap between the lower edge of the deep blades 31 and the fingers 58. The fit is comparatively loose so that the blanking plate can be withdrawn forwardly from the position shown.

The blanking plate 59 is provided toward its front edge with a depending stop or flange 60 which abuts the front ends of the fingers 58 and serves as a locating means which maintains the front part of the blanking plate 59 underneath the first few discharge spaces 37, regardless of the front to back width dimension of the front blanking plate. When the rear edge of the plate 59 abuts the bracket 57, as shown, the horizontal flange of the angle 56 contributes to the blanking effect.

In operation, if the blanking plate 59 is not present, threshed grains will drop down through the discharge spaces 37 onto a feed pan 61 (FIG. 1), from which the grains and other material are advanced rearwardly to a sieve 62 constituting a part of the grain separating mechanism 17, all as described in detail in my copending application Ser. No. 186,053 filed Oct. 4, 1971.

However, in the case of certain grains, it is desired to retard the threshing action and therefore the blanking plate 59 is inserted, which causes the grains and smaller particles to build up in the front part of the concave 25 so that they are not immediately discharged onto the feed pan 61.

The extent of blanking varies with different crops and different crop conditions; according to my invention, a series of blanking plates are provided of varying widths, so that the blanking can be regulated according to conditions. The provision of the locating flange 60 on each assures that the blanking plate, when used, will always have its front edge close to the front bar 35.

The tray 27 is removably supported on hangers 63 and 64 for sliding movement in the transverse direction so that it can be removed. The front hanger 63 is attached to the bottom conduit wall 24, and the rear hanger 64 is attached to the removable front bar 35. A hinged access door 65 is provided in each of the side walls 23. Any rocks that are picked up by the header and conveyed by the elevator 21 toward the cylinder 16 will drop into the tray 27. Cut crop also tends to accumulate in the tray but is displaced by the much heavier rocks. At suitable intervals, the rocks are removed by sliding the tray out of the casing.

When it is desired to insert or remove the blanking plate 59, the tray 27 is first removed. Then the screws 36 are removed so that the front bar 35 can be taken away, thus providing access to the blanking plate 59 or to the gap above the fingers 58 into which the blanking plate is to be inserted. The screws 36 are located only toward each side end of the front bar 35 so they are readily accessible when the access doors 65 at each side of the casing are opened.

Although only a preferred embodiment of my invention has been shown and illustrated herein, it will be understood that various modifications and changes can be made in the construction shown without departing from the spirit of my invention, as pointed out in the appended claims.

I claim:

1. A concave for a combine comprising a grate structure having spaced side plates, a plurality of transverse concave bars extending from one side plate to the other and being secured thereto, a removable shelf located beneath the front part of said grate structure and spaced beneath the lower edges of said concave bars, and means for removably mounting said shelf, said shelf mounting means comprising a transverse member secured at each side end to said side plates, a plurality of brackets secured to said transverse member each having a forwardly extending finger located beneath said concave bars, said shelf comprising a plate member resting on the fingers of said brackets, and locating means to maintain said shelf at the front part of said grate structure so that it underlies the front portion thereof.

2. A concave as claimed in claim 1 in which said locating means includes downwardly extending stop means on said plate member engaging the front edges of said fingers to prevent rearward movement of said plate member.

3. A concave as claimed in claim 1 which includes a front plate disposed forwardly of said concave bars and extending from one side plate to the other and being secured thereto, a front concave bar removably mounted on said front plate and extending downwardly in front of said shelf to prevent removal thereof in a forwardly direction.

4. In a combine having a threshing cylinder, and a casing enclosing said threshing cylinder, the combination of a concave located beneath said threshing cylinder within said casing, said concave comprising a grate structure having spaced side plates, and a plurality of concave bars extending from one side plate to the other and being secured to said side plates, a front plate extending from one side plate to the other, a front concave bar removably mounted on said front plate, a shelf located beneath the front part of said grate structure and behind said removable front bar member, and means supporting said shelf in a position spaced beneath the first few of said first mentioned concave bars, said support means permitting withdrawal of said shelf therefrom in the forward direction after removal of said front concave bar from said front plate, said casing including side walls, and a door in each side wall located adjacent the side edges of said removable front concave bar to provide access to same for removing same from said front plate and for removing said shelf from said support means.

5. In a combine having a threshing cylinder, and a casing enclosing said threshing cylinder, the combination of a concave located beneath said threshing cylinder within said casing, said concave comprising a grate structure having spaced side plates, a plurality of concave bars extending from one side plate to the other and being secured thereto, said concave bars having discharge spaces therebetween to accommodate downward movement of threshed crop material, a removable shelf located beneath the front part of said grate structure and spaced beneath the lower edges of said concave bars for blocking downward movement of threshed crop material at said front part, means for removably supporting said shelf, said casing including side walls, and a door in at least one side wall located to provide access to said shelf for removing said shelf from said support means.

6. A combine as claimed in claim 5 which includes locating means to maintain said shelf at the front part of said grate structure so that it underlies the front portion thereof.

* * * * *